March 19, 1946.   R. E. LEE   2,397,020
GAUGE
Filed June 6, 1944
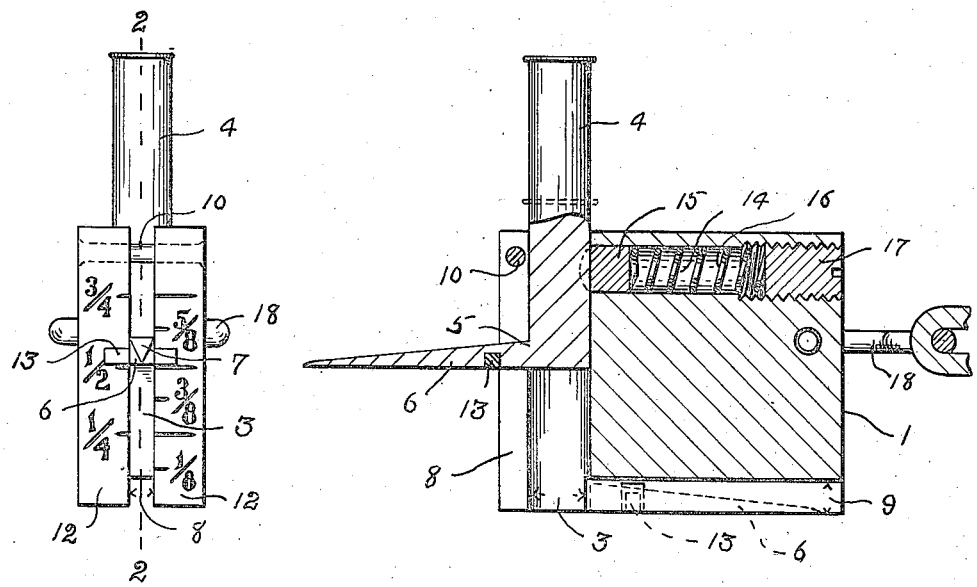
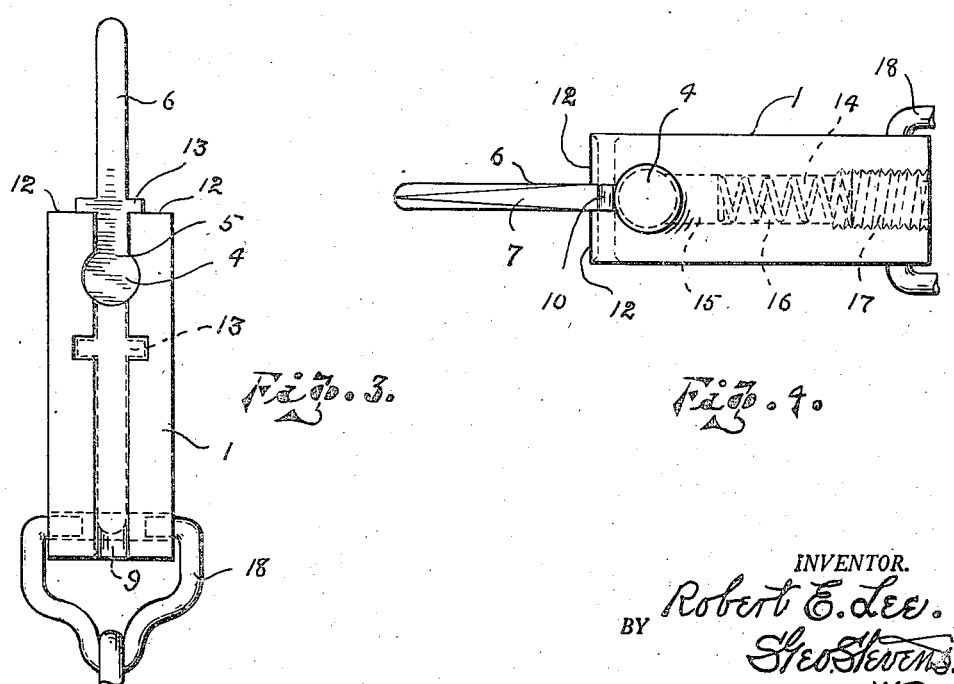
INVENTOR.
BY Robert E. Lee
Geo Stevens
atty.

Patented Mar. 19, 1946

2,397,020

UNITED STATES PATENT OFFICE 2,397,020

GAUGE

Robert E. Lee, Duluth, Minn.

Application June 6, 1944, Serial No. 538,959

1 Claim. (Cl. 33—169)

This invention relates to improvements in gauges; that is, gauges used in measuring the fillet weld required between two pieces of material that are to be welded together.

The principal objects of this invention are: durability, simplicity of construction and use also, compactness, convenience, and safety while being carried on one's person. Other objects and advantages may appear in the further description and drawing of this invention.

Referring now to the drawing, forming part of this application and in which the views are substantially twice the actual size of the device, corresponding reference numerals indicate like parts:

Fig. 1 is a front or face elevation of said gauge,

Fig. 2 is a sectional view taken on the line 2—2 of Fig. 1,

Fig. 3 is a bottom view of said gauge, and

Fig. 4 is a top view of Fig. 1.

In the drawing, 1 represents the rectangular body portion of the device, and is made preferably of any light durable metal. Adjacent the face portion of the body 1 is a bore 3 of a constant diameter throughout. This bore 3 is perpendicular to the plane of the bottom surface of the body and is centered intermediate of the two side surfaces thereof.

A manually reciprocal and rotatable pintle 4 is installed within the bore 3 and has fixed thereto as at 5 an indicator or pointer 6 whose flat under surface is at all times parallel to the bottom surface of the body 1. The upper surface of the pointer 6 is shaped preferably as shown at 7 so as to increase the strength thereof. This pointer, when in its lowermost position, is swingable, with the rotation of the pintle 4, to any radial position desired, but obviously must register with the lower end of the vertical central slot 8 in the face of the body portion of the gauge before it can be raised to any desired elevation within said slot when being used. This slot 8 is just wide enough to allow the pointer to slide freely therein.

The slot 9 longitudinally the bottom of the body portion is for the storage of the pointer when the latter is not in use, for example, when carried about in one's pocket, and its relative position within said slot is indicated in dotted lines Figs. 2 and 3 of the drawing. Thus the safety of the device is apparent when stored in the manner just described.

The upward limit of the pintle 4 and pointer 6 is determined by the transverse pin 10 which will not permit them to be raised beyond the point of engagement of the pointer with said pin, and their lowermost position is determined by the flanged head portion of the pintle 4, it being slightly larger in diameter than the bore 3 in which the pintle is mounted.

Upon the front face of the two spaced opposed column-like members 12—12 of the body are graduation marks for selective positioning of the pointer prior to its use.

The pointer is shown as being provided at its juncture with the pintle 4, or rather adjacent same and just forwardly of the members 12—12, with the relatively short crossbar member 13 for more accurate registration of the pointer with the graduations upon the face of said members. However, this auxiliary member 13 may be dispensed with if deemed nonessential as the flat bottom of the pointer may be considered sufficient for ordinary purposes.

For suitable friction control of the pintle 4, there is installed within the longitudinal bore 14, in the upper portion of the body 1, a reciprocal plug 15 designed to contact the pintle 4 and its frictional contact against the pintle is controlled by the helical expansive spring 16 within said bore, and adjustably held therewithin as by the screwthreaded plug 17.

As attachment means for tethering the device, I have shown a pivotal link 18 to which such may be readily attached.

The utility of this improved gauge is thought apparent in that a welder having a specification to follow as to the required dimension of welds to be made, may readily set his gauge accordingly and make repeated and most convenient use of same as the work progresses.

Having thus described one practical embodiment of the invention, what I claim as new and desire to protect by Letters Patent is as follows:

In a fillet gauge of the type described, a substantially rectangularly shaped body portion, a vertically disposed bore adjacent the front end of said body portion and communicating its entire length with an open slot in the face of said body portion, a pintle rotatably and reciprocably carried within said bore, a radially disposed pointer carried upon the lower end of said pintle and normally extending through said slot, an open slot within the bottom of said body portion communicating at its forward end with said bore for the housing of said pointer when the latter is lowered and turned to register therewith when the gauge is not in use.

ROBERT E. LEE.